United States Patent [19]

Davis

[11] 4,298,948
[45] Nov. 3, 1981

[54] METHOD AND APPARATUS FOR GENERATING A DIGITAL REPRESENTATION OF THE INSTANTANEOUS ANGULAR POSITION OF A ROTATING BODY AND FOR GENERATING RECTANGULAR COORDINATE EQUIVALENTS THEREOF

[75] Inventor: Dean T. Davis, Columbus, Ohio

[73] Assignee: IRD Mechanalysis, Inc., Worthington, Ohio

[21] Appl. No.: 98,729

[22] Filed: Nov. 30, 1979

[51] Int. Cl.$^3$ .......................... G06J 1/00; G01M 1/22
[52] U.S. Cl. ..................................... 364/603; 73/462; 73/660; 364/463; 364/508
[58] Field of Search ............... 364/729, 730, 603, 815, 364/817, 508, 463; 340/347 SY, 683; 73/570, 602, 658, 660, 462–467; 250/231 SE; 235/92 FQ, 92 CC

[56] References Cited

U.S. PATENT DOCUMENTS

| | | | |
|---|---|---|---|
| 3,731,526 | 5/1973 | Games | 73/660 |
| 3,751,987 | 8/1973 | Whitmore | 73/465 |
| 3,754,447 | 8/1973 | Turton-Smith et al. | 73/466 X |
| 3,939,715 | 2/1976 | Davis | 73/462 |
| 4,015,480 | 4/1977 | Giers | 364/508 X |
| 4,090,244 | 5/1978 | Altwein | 364/508 X |
| 4,201,091 | 5/1980 | Guyot et al. | 73/462 |

Primary Examiner—Joseph F. Ruggiero
Attorney, Agent, or Firm—Mueller and Smith

[57] ABSTRACT

A rotating body, through appropriate pickup devices, generates one pulse for each rotation. The pulses are delivered to a phase locked loop which generates $2^n$ pulses for each input pulse and selects every $2^n$th pulse for comparison with the generated pulse. The $2^n$ pulses are counted in a multistage binary counter having n outputs to deliver a sequence of ordered binary-coded signals comprising a digital representation of the instantaneous angular position of the rotating body. In a further embodiment of the invention, the digital representation of the angular position of the rotating body is converted through read-only-memory (ROM) units and digital-to-analog converters into rectangular coordinate representations of the instantaneous angular position of the rotating body. With suitable multipliers, that rectangular coordinate representation can be combined with an instantaneous vibration manifestation signal derived from the rotating body to generate quadrature signals which uniquely identify the amount and location of instantaneous vibration manifestation of the rotating body.

14 Claims, 4 Drawing Figures

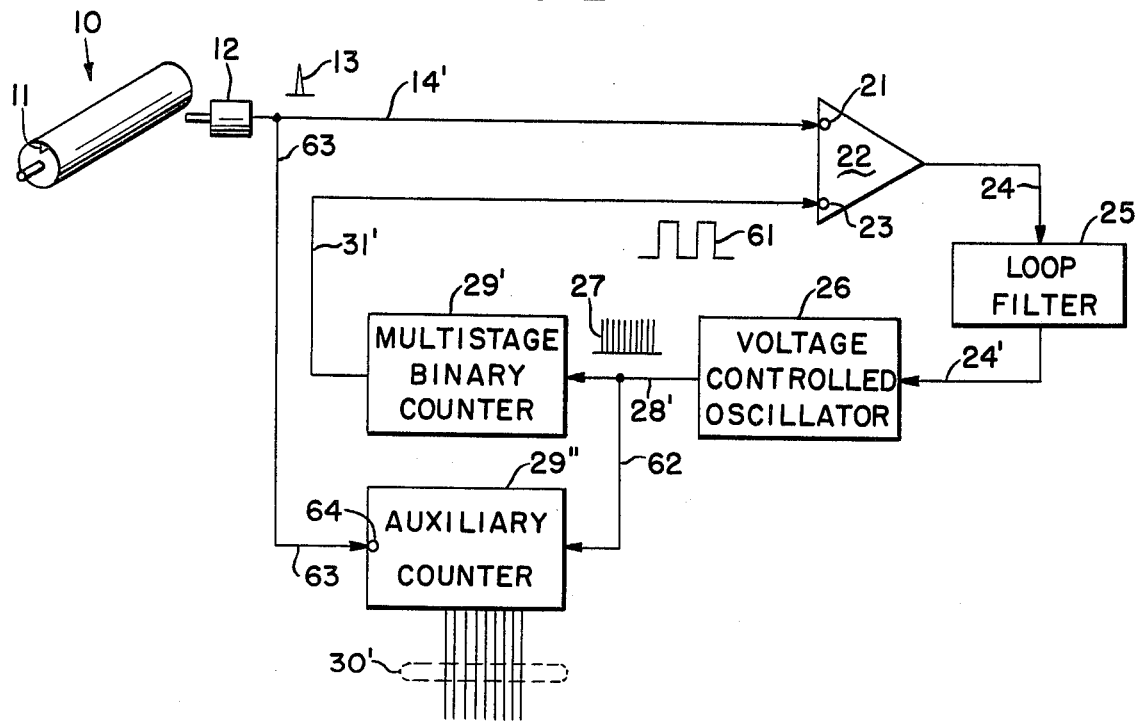
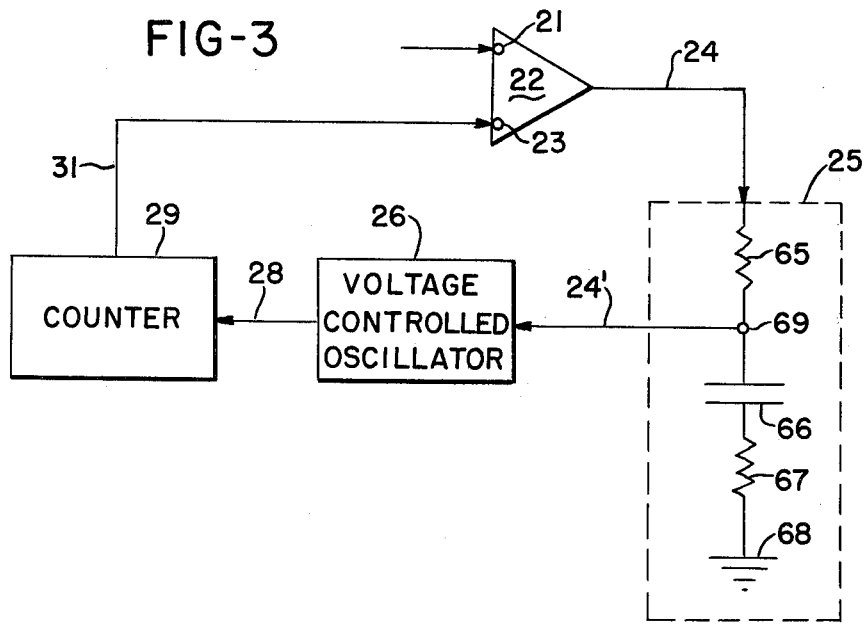

METHOD AND APPARATUS FOR GENERATING A DIGITAL REPRESENTATION OF THE INSTANTANEOUS ANGULAR POSITION OF A ROTATING BODY AND FOR GENERATING RECTANGULAR COORDINATE EQUIVALENTS THEREOF

CROSS-REFERENCES TO RELATED APPLICATIONS (IF ANY)

Apparatus embodying features illustrated and claimed in this application are shown but not claimed in copending U.S. application Ser. No. 31,702 filed Apr. 20, 1979.

BACKGROUND OF THE INVENTION

1. Field of the Invention

The present invention relates to electronic circuitry for generating a digital representation of the instantaneous angular position of a rotating body and for generating rectangular coordinate signals which represent the instantaneous angular position of the rotating body.

2. Description of the Prior Art

In order to analyze the vibration phenomena of rotating bodies, it is necessary to measure the magnitude of the vibration and to relate that vibration magnitude to the instantaneous angular position of the rotating body. These two parameters have been referred to as the vibration signal and the reference signal. Reference signals have been generated by sine wave generators or square wave generators physically connected to the rotating body; and by various electronic signal generators which produce sinusoidal signals which are manually tuned into synchronism with the rotating body, e.g., stroboscopic lamps.

There is a need for a reference signal generator which can automatically, without manual intervention, generate periodic reference signals which are in harmonic synchronization with the rotating body.

SUMMARY OF THE INVENTION

According to the present invention, a rotating body is provided with a transducer adapted to generate a single pulse for each revolution. The generated pulse signal is applied to a phase lock loop circuit including a phase comparator, a loop filter, a voltage controlled oscillator and a multistage binary counter. The multistage binary counter generates a binary-coded signal which is maintained in synchronism with the generated pulses from the rotating body by means of the phase lock loop. The multistage binary counter, in addition, generates a digital output having n bits representing the instantaneous angular position of the rotating body. Each rotation of the rotating body thus is divided into $2^n$ equally spaced fragments. Where n equals 8, each rotating cycle is divided into 256 fragments. Where n equals 9, each rotation cycle is divided into 512 fragments, et cetera.

In a further embodiment of the invention, the digital representation signals are employed to drive a sine read-only-memory (ROM) device adapted to generate a digital representation of the sine function corresponding to the instantaneous angular position of the rotating body relative to a reference position. Similarly the digital representations are applied to a cosine read-only-memory (ROM) device for generating a digital representation of the cosine function of the instantaneous position of the rotating body relative to the reference position. With conventional digital-to-analog converters, the digital representation of the sine and of the cosine can be converted into sinusoidally varying signals which are synchronized with the instantaneous position of the rotating body. In a still further embodiment of the invention, a vibration signal, related to the instantaneous magnitude of mechanical vibration of the rotating body, is multiplied by the sine signal and multiplied by the cosine signal obtained from the described operation to produce two electrical signals which represent an instantaneous rectangular coordinate representation of the instantaneous polar coordinate disposition of the rotating body vibration. These two electrical signals can be employed in a variety of useful ways, for example, as described in copending U.S. patent application Ser. No. 31,702 aforesaid.

BRIEF DESCRIPTION OF THE DRAWINGS

FIG. 2 is a schematic illustration of alternative circuitry for carrying out the present invention;

FIG. 3 is a fragmentary schematic illustration of a portion of the phase lock loop circuit shown in FIGS. 1 and 2;

DESCRIPTION OF THE PREFERRED EMBODIMENT(S)

Figure 1:
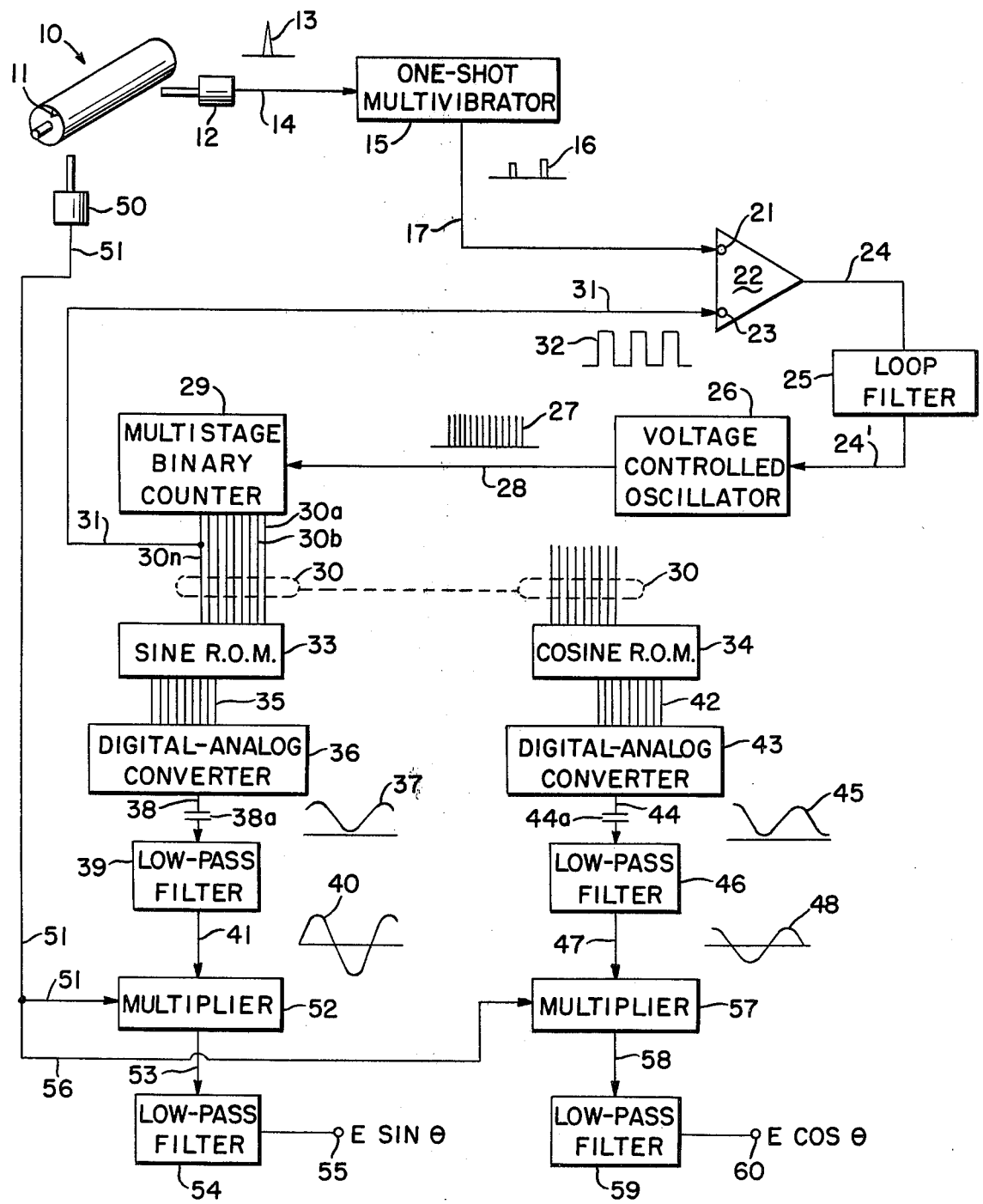
FIG. 1 is a schematic illustration of a preferred embodiment of circuitry for carrying out the present invention.

According to this invention, a rotating body 10 has a reference indicator 11 which may be a magnet, a keyway, a light (or dark) spot, or some other indication which can be detected by a pulse generating detector 12. If the indicator 11 is a magnet, the pulse generator 12 may be a coiled conductor which is influenced by the proximity of the magnet once per revolution. Alternatively, if the indicator 11 is a light (or dark) spot, the pulse generator 12 may be an optical pulse generator. In any event the pulse generator 12 produces a pulse signal 13 which is delivered through a conductor 14 to a one-shot multivibrator 15 for the purpose of generating a sharp reproducible pulse signal 16 for each rotation of the rotating body 10. The pulse signals 16 are delivered through a conductor 17 to an input terminal 21 of a phase comparator 22 which is a digital edge-detecting comparator, e.g., a CMOS 4046. The phase comparator 22 compares the signal 16 which is applied at the input terminal 21 with another signal (hereinafter to be described) applied to the other input terminal 23. So long as the signals applied to the terminals 21, 23 are synchronized, the output voltage, applied through a conductor 24 and a loop filter 25 remains at its existing value in a conductor 24'. That output voltage, at conductor 24', is a DC signal, which is delivered to a voltage controlled oscillator 26. The voltage controlled oscillator 26 develops an output signal 27 which consists of a train of uniformly spaced pulses at a frequency which is established by the value of the direct current voltage applied from the conductor 24'. In a typical installation, the frequency of the voltage controlled oscillator 26 is established at $2^n$ times the rotational velocity of the rotor 10 in cycles per second. Thus if n is 10, $2^n$ equals 1024 and the frequency of the electrical pulsed signal 27 will be 1024 times the rotational speed of the rotor 10. The signal 27 is delivered through a conductor 28 to a multistage binary counter 29 having n stages and producing n output signals. The binary counter 29 functions to count the electrical pulses of the signal 27 in a binary signal code. The output signal from each stage of the counter 29 is delivered through conductors 30 for presenting in binary-coded signals the instantaneous angular location of the rotor 10 in a manner hereinafter to be described. The signal delivered at the first stage output through conductor 30a has a frequency which is $2^{n-1}$ times the rotational velocity of the rotor 10. Similarly, the signal resulting from the second stage delivered to the conductor 30b has a frequency which is $2^{n-2}$ times the rotational velocity of the rotor 10. The signal from the nth stage, delivered through the conductor 30n, has a frequency which is equal to the rotational frequency of the rotor 10, i.e., a square wave having a cycle period identical to that of the rotor 10. The signal 32 delivered from the nth stage of the multistage binary counter 29 is delivered from the conductor 30n through a conductor 31 to the alternative input terminal 23 of the phase comparator 22. It will be observed that the signal 32 appearing in conductor 31 is a square wave having a frequency identical with that of the pulse signal 16 applied to the terminal 21. So long as the signals 16, 32 are synchronized in phase, the DC voltage appearing in the conductor 24' remains constant.

If the signals 16, 32 become out of phase, then the signal 16 no longer coincides with the $2^n$th pulse of the signal 27. The phase comparator 22 will increase or decrease the voltage appearing in the conductor 24' in order to adjust the frequency of the voltage controlled oscillator 26 according to the difference in the comparison so that the phase synchronization between the signals 16, 32 is restored.

The multistage binary counter 29 runs through its $2^n$ states once for every rotation of the rotor 10 and produces $2^n$ different digital representations in the conductors 30, each representation uniquely represents $2^n$ instantaneous angular positions of the rotor 10.

TABLE I

| | DIGITAL REPRESENTATION OF INSTANTANEOUS ROTOR POSITION OVER ONE CYCLE | | | | |
|---|---|---|---|---|---|
| | Stage | | | | |
| Reference | nth | ...... | 3rd | 2nd | 1st |
| 0 | 0 | ...... | 0 | 0 | 0 |
| 1 | 0 | ...... | 0 | 0 | 1 |
| 2 | 0 | ...... | 0 | 1 | 0 |
| 3 | 0 | ...... | 0 | 1 | 1 |
| 4 | 0 | ...... | 1 | 0 | 0 |
| 5 | 0 | ...... | 1 | 0 | 1 |
| 6 | 0 | ...... | 1 | 1 | 0 |
| 7 | 0 | ...... | 1 | 1 | 1 |
| ...... | | ...... | | | |
| $2^n$-2 | 1 | ...... | 1 | 1 | 0 |
| $2^n$-1 | 1 | ...... | 1 | 1 | 1 |
| $2^n$ (same as 0) | 0 | ...... | 0 | 0 | 0 |

The digital representation appearing in the conductors 30 is a binary-coded signal which is useful in a variety of observation and control devices but is particularly useful when combined with a sine read-only-memory (ROM) device 33 and cosine read-only-memory (ROM) device 34. The digital representation in conductors 30 are delivered to the sine ROM 33 and also to the cosine ROM 34 through n conductors. The sine ROM 33 is preprogrammed to deliver through output conductors 35 a digital representation of the trigonometric sine value corresponding to the digital representations which are applied to the input terminal of the sine ROM from the conductors 30. The digital representation appearing in the conductors 35 corresponds to a complete single cycle sine wave divided into $2^n$ uniform steps. The sine ROM is programmed according to the following equation $$\text{Sine Output} = 2^{m-1} + (2^{m-1} - 1)\text{Sin}\left[\frac{360}{X}(x + \tfrac{1}{2})\right]$$

wherein m is the number of output conductors 35;

$2^{m-1}$ is one-half of the maximum output count from the sine ROM;

X is the number of points—that is, $2^n$; and x is the address to the sine ROM, i.e., the binary-coded signal.

When thus programmed, the resulting sine wave signal has a value which is offset from zero voltage about a reference voltage which is $2^{m-1}$ above zero voltage. The sine wave signal amplitude is $2^{m-1}-1$ above and below the reference.

Figure 4:
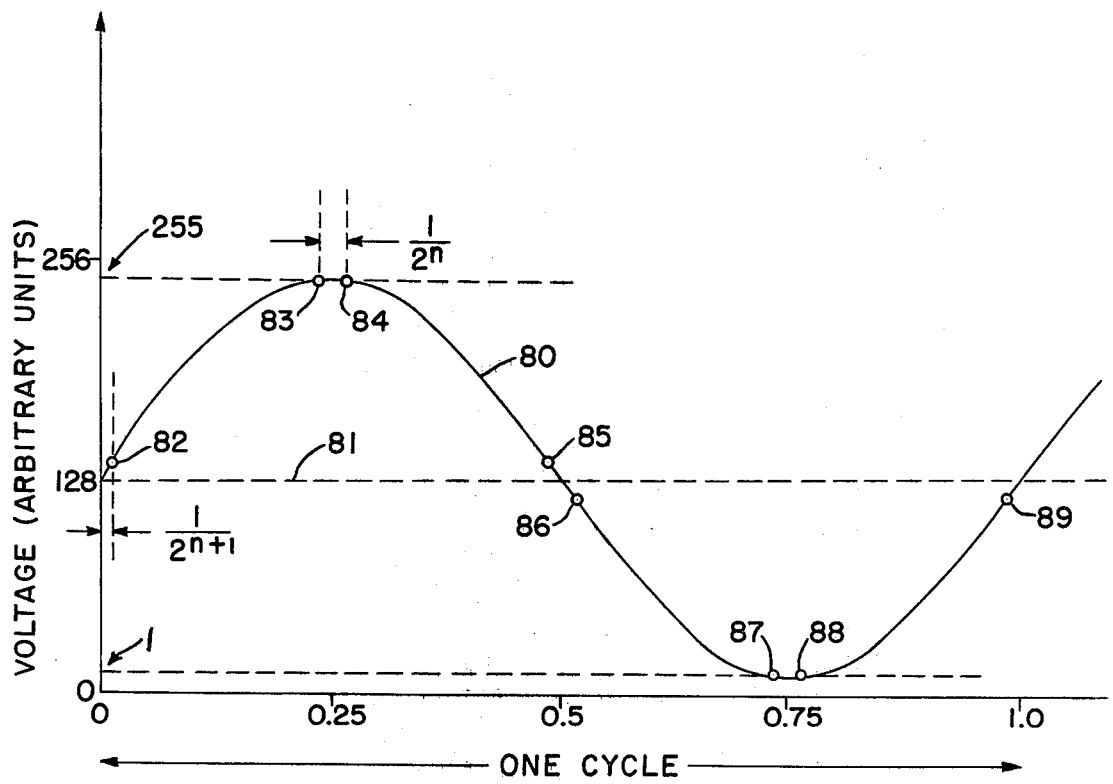
FIG. 4 is a graphical representation of a sine wave signal obtained in a preferred embodiment of the invention.

The resulting sine wave signal 80, shown in FIG. 4, will have an excursion above and below a mid-voltage level 81 which has a value corresponding to $2^{m-1}$, i.e., wherein, if m equals 8, the mid-voltage level 81 will be 128 (units). The sine wave correspondingly will range in value from 1 to 255 (units). The actual values for the sine wave signal 80 do not correspond to the mid-level 81 crossing, nor do the actual values correspond to the peak values occurring at 0.25 and 0.75 cycle. Instead, the foregoing equation presents values which are displaced from the mid-level crossing and from the peak values by one-half unit. Note the actual points 82, 83, 84, 85, 86, 87, 88, 89. The points 82, 85, 86, 89 are spaced by $1/2^{n+1}$ from the mid-voltage 81 crossings.

Similarly the points 83, 84 and 87, 88 are spaced apart by $1/2^n$, i.e., each point is spaced from the adjacent peak by $1/2^{n+1}$.

The digital representation of a sine wave, thus developed at the conductors 35, corresponds to the instantaneous position of the rotor 10. The signal at the conductors 35 is converted in a digital-to-analog converter 36 into a sinusoidally varying direct current signal 37 at the conductor 38. The signal 37 is AC-coupled through a capacitor 38a and a low pass filter 39 and converted to a sine wave 40 appearing at the conductor 41. The sine wave 40 is synchronized precisely with the instantaneous angular position of the rotor 10. Similarly, in a parallel circuit, the cosine ROM 34 develops a digital representation of a cosine of the unique rotor position in the conductors 42 which is delivered to a digital-to-analog converter 43 to produce at the conductor 44 a harmonic signal 45 which increases and decreases according to the cosine of the digital representation applied at the conductors 30. The signal from the conductor 44 is AC-coupled through a capacitor 44a and a low pass filter 46 to a conductor 47 where the signal 48 appears as the cosine of the instantaneous position of the rotor 10.

The sine signal 40 and cosine signal 48 are precisely 90° spaced from each other and are both synchronized in frequency with the rotor 10.

When the present circuitry is employed in vibration analysis installations, a vibration transducer 50 is employed to detect the instantaneous mechanical vibrations of the rotor 50 and generate an electrical signal E through a conductor 51. As is well known, the signal E will vary cyclically with the rotation of the rotor 10. The signal E is applied through the conductor 51 to a multiplier 52 along with the sine signal 40 which is delivered through conductor 41. The multiplier 52 generates an output signal at the conductor 53 which is delivered through a low pass filter 54 to produce at an output terminal 55 a resulting signal corresponding to E sine $\theta$ where $\theta$ is the phase angle between the vibration signal E and the reference sine wave 40; E corresponds to the peak vibration amplitude. Similarly the vibration signal from the transducer 50 can be delivered through the conductor 51 and through a conductor 56 to a multiplier 57. The multiplier 57 produces an output at conductor 58 which is delivered through a low pass filter 59 to an output terminal 60. The output terminal 60 develops a signal E cosine $\theta$.

It will be observed that the output signals at the terminals 55, 60 have DC values which correspond to the sine and cosine of the average phase angle $\theta$ between the vector E and the reference signal as the rotor rotates through several cycles. The values developed at the terminals 55, 60 are useful in vibration analysis, detection and measurement.

Alternative Embodiments

Referring to FIG. 2, there is illustrated a rotor 10 having a once-per-revolution indicator 11 and a pulse generator 12 responsive to the instantaneous once-per-cycle location of the indicator 11. The pulse generator 12 generates a pulse signal, once per rotation through a conductor 14'. The pulse 13 is applied to the input terminal 21 of a phase comparator 22. The phase comparator 22 delivers an output signal through a conductor 24 through a loop filter 25 to a voltage controlled oscillator 26 through conductor 24'. The voltage controlled oscillator 26 delivers an output signal 27 consisting of pulses having a frequency which is $2^n$ times the rotational velocity of the rotor 10. The signal 27 is delivered through a conductor 28' to a multistage binary counter 29' which contains n stages. The multistage binary counter 29' differs from the multistage binary counter 29 of FIG. 1 in that the multistage binary counter 29' has only a single output which is the output of the nth stage delivered through a conductor 31' to the terminal 23 of the phase comparator 22. The signal applied to the conductor 31' is a square wave 61 having a leading edge which is in synchronism with the pulse 13. The square wave 61 has a frequency which is precisely that of the rotating body 10. So long as the leading edge of the signal 61 is synchronized with the pulse 13, the phase comparator 22 maintains the voltage appearing at the conductor 24'. If the leading edge of the signal 61 is out of synchronization with the pulse 13, then the direct current voltage in the conductor 24' will increase or decrease as required to alter the output frequency from the voltage controlled oscillator 26 in precisely the same fashion as described in FIG. 1.

Another feature of the circuitry in FIG. 2 is the auxiliary multistage binary counter 29" which receives the pulsed signal 27 from a conductor 62 and delivers a digital representation of the instantaneous position of the rotor 10 through a series of output conductors 30'. In this respect, the auxiliary multistage binary counter 29" corresponds to the multistage binary counter 29 of FIG. 1.

A still further variation in FIG. 2 is the use of an instantaneous error correction technique which employs a conductor 63 which delivers the pulse signal 13 directly to a reset terminal 64 of the auxiliary multistage binary counter 29". The error correction feature performs in the following manner. The presentation of the pulse 13 in the conductor 63 instantaneously resets the auxiliary multistage binary counter 29" to zero. The resetting occurs regardless of whether the multiple stages of the auxiliary multistage binary counter 29' have run through their entire cycle or not. When the system of FIG. 2 is in total synchronism, the pulse 13 will coincide with the automatic reset of the auxiliary multistage binary counter and the reset pulse at the reset terminal 64 will be redundant.

When the speed of the rotor 10 is changing, the pulse 13 will lead or lag the normal counter reset. The result is that the count will always be started on zero count when the shaft reference is positioned under the pulse generator 12. This correction will occur once per revolution of the rotor—or—more frequently if the installation supplies multiple evenly spaced pulses for each rotation of the rotor 10.

In a preferred embodiment of the present circuitry, the phase comparator 22 and the voltage controlled oscillator 26 are presented in an available digital phase-locked loop device known as a CMOS 4046. The loop filter device 25 is connected to selected output terminals of the CMOS 4046.

A preferred embodiment employs a CMOS 4046 (operational amplifier) in its type II mode wherein the phase comparator forces a coincidence of two leading edges of signals or pulses.

As shown in FIG. 3, the loop filter 25 will be more fully described. The type II phase comparator 22 demonstrates three possible states: high, low and open. The output of the phase comparator 22 is delivered through a conductor 24 to the loop filter 25 which includes a resistor 65, a capacitor 66, a stabilizing resistor 67 and a ground terminal 68. The conductor 24' continues to the voltage controlled oscillator 26 through the resistor 65. The resistor 65 and capacitor 66 constitute a capacitor/resistor integrator.

In operation, when the signal at the input terminals 21, 23 of the phase comparator 22 are in synchronism, the phase comparator 22 will be in its open state and the voltage appearing at the terminal 69, between the resistor 65 and capacitor 66, will remain at its existing level whereby the voltage controlled oscillator 26 will continue to generate an output signal at the existing frequency. In the event the signals delivered to the comparator input terminals 21, 23 are out of phase in one direction, the phase comparator 22 will be in the low (or high) state. If the signals applied to the terminals 21, 23 of the phase comparator 22 are out of phase in the other direction, the phase comparator will be high (or low). When the phase comparator is low, the capacitor 66 will develop a lower voltage at the terminal 69 causing the voltage controlled oscillator 26 to change the frequency of its output signal correspondingly. When the phase comparator 22 is in the high state, the capacitor 26 will present a higher voltage at the terminal 69 whereby the voltage controlled oscillator will change the frequency of its output signal in the opposite direction. The hunting will continue until the signals applied to the terminals 21, 23 are in synchronization at which time the phase comparator 22 will be in its open state and the voltage then applied by the capacitor 66 to the terminal 69 will remain fixed so long as the synchronization continues.

I claim:

1. A method for generating a sinusoidal electrical reference signal corresponding to the instantaneous angular position of a rotating body which comprises:
generating one or more uniformly spaced electrical original pulses for each rotation of the said rotating body;
generating an electrical pulsed signal having $2^n$ uniformly spaced pulses between each of said original pulses;
counting the pulses of said uniformly spaced pulses in a binary code signal counter which uniquely represents $2^n$ angular positions of the said rotating body; then converting the said binary code signal in a sine function read only memory device to a digital representation of a sine function which corresponds to the instantaneous angular position of the said rotating body; and
then filtering the digital representation of the sine function to a corresponding analog representation of the same sine function which is synchronized with the instantaneous angular position of the said rotating body.

2. The method of claim 1 wherein the said sine function read-only-memory device is programmed according to the following equation:

$$\text{Sine Output} = 2^{m-1} + (2^{m-1} - 1)\text{Sin}\frac{360}{X}(x + \tfrac{1}{2})$$

wherein m is the number of output bits of said memory; $2^{m-1}$ is one-half of the maximum output count from the memory;
X is $2^n$; and
x is the address to the memory.

3. Apparatus for carrying out the analysis of a rotating body by product detection technique comprising:
means for generating a pulse signal in correspondence with a revolution of said body;
oscillator means controllable to provide an oscillatory output signal at a frequency corresponding with a multiple of the rate of rotation of said body;
a multistage counter responsive to said oscillator means output for providing binary output signals and having a select stage output correspondable with said revolution of said body;
edge detecting comparator means responsive to said pulse signal and said counter select stage output for deriving a phase locked loop control of said oscillator means;
memory means addressable by said counter binary output signals to provide digital sinusoid output signals;
converter means responsive to said digital sinusoid output signals for deriving an analog sinusoid signal corresponding thereto;
filter means responsive to said analog sinusoid signal for providing a filtered reference output corresponding therewith; and
multiplier means for multiplying said reference output by an analog signal to provide a vector and phase responsive output.

4. The apparatus of claim 3 in which said filter means comprises:
capacitor means for providing a d.c. term block treating the offset of said analog sinusoid signal; and
low-pas filter means for effecting ripple removal from said analog sinusoid signal.

5. The apparatus of claim 3 in which said means for generating a pulse signal in correspondence with a revolution of said body includes a photo responsive pickup component having an output signal corresponding with each complete revolution of said body; and multivibrator means responsive to said output signal for deriving said pulse signal.

6. Apparatus according to claim 3 wherein:
said multistage counter is a binary counter having n stages;
said oscillator means generates said output signal as a repetitive signal having a said frequency which is $2^n$ times the rotational velocity of the said rotating body; and
including means for connecting the said oscillator means to the said multistage binary counter, whereby the said multistage binary counter cycles once through its n stages for each rotation of the said rotating body.

7. The apparatus of claim 6 wherein said comparator means is configured to maintain the output signal from the nth stage of the said multistage binary counter in synchronism with the said pulse signal.

8. Apparatus according to claim 7 wherein the said comparator means includes a phase comparator connected through a loop filter to the said oscillator means.

9. Apparatus according to claim 6 wherein the said memory means is a trigonometric sine solid state read-only memory programmed according to the following equation:

$$\text{Sine Output} = 2^{m-1} + (2^{m-1} - 1)\text{Sin}\frac{360}{X}(x + \tfrac{1}{2})$$

wherein m is the number of output bits of said memory:
$2^{m-1}$ is one-half of the maximum output count from the memory;
X is $2^n$; and
x is the address to the memory.

10. Apparatus according to claim 6 wherein:
said oscillator means is a voltage controlled oscillator adapted to generate said oscillatory output signal as a repetitive signal having a frequency which is $2^n$ times the rotational speed of the said rotating body;
said multistage binary counter is adapted to count the said repetitive signal through n stages;
said edge detecting comparator means maintains the output signal from the nth stage of the said multistage binary counter in synchronism with the said pulse signal; and
including an auxiliary multistage binary counter having n stages for counting the said repetitive signal and generating a series of ordered binary signals; and
reset means associated with said auxiliary multistage binary counter responsive to said pulse signal to reset the said auxiliary binary counter.

11. Apparatus for carrying out the vibration related analysis of a rotating body comprising:
means for generating a pulse signal in correspondence with a revolution of said body;
oscillator means controllable to provide an oscillatory output signal at a frequency corresponding with a multiple of the rate of rotation of said body;
first multistage counter means responsive to said oscillator means output for carrying out a frequency division thereof to provide a select stage output correspondable with said revolution of said body;
edge detecting comparator means responsive to said pulse signal and said first counter select stage output for deriving a phase locked loop control of said oscillator means;

second multistage counter means responsive to said oscillator means output for providing binary output signals and coupled for reset response to said pulse signal;

memory means addressable by said second counter means binary output signals to provide digital sinusoidal output signals; and means responsive to said digital sinusoidal output signals for providing a sinusoidal reference signal.

12. The apparatus of claim 11 in which:

said means responsive to said digital sinusoidal output signals comprises filter means for providing a filtered reference output corresponding therewith; and including multiplier means for multiplying said reference output by an analog signal to provide a vector and phase responsive output.

13. The apparatus of claim 11 in which said filter means comprises:

capacitor means for providing a d.c. term block treating the offset of digital sinusoidal output signals; and low-pass filter means for effecting ripple removal from said digital sinusoidal output signals.

14. Apparatus for carrying out the analysis of a rotating body comprising:

means for generating a pulse signal in correspondence with a revolution of said body;

oscillator means responsive to a controlling input signal for providing an oscillatory output signal having a frequency corresponding with said controlling input signal;

multistage counter means responsive to said oscillator means output for carrying out a frequency division thereof to provide count outputs including a select stage output correspondable with said revolution of said body;

edge detecting comparator means responsive to said pulse signal and said counter means select stage output for generating said controlling input signal to effect the generation of said frequency as a select multiple of the rate of rotation of said body; and means responsive to said counter means count outputs for generating a sinusoidal reference signal.

* * * * *